Dec. 25, 1962 J. S. EGGENBERGER 3,070,782

MEMORY ARRAY

Filed Nov. 25, 1958 2 Sheets-Sheet 1

EMBODIMENT NO. 1

INVENTOR
JOHN S. EGGENBERGER

BY William V. Schelberg
AGENT

EMBODIMENT NO. 2

EMBODIMENT NO. 3

United States Patent Office
3,070,782
Patented Dec. 25, 1962

3,070,782
MEMORY ARRAY

John S. Eggenberger, Hillside Lake, Wappingers Falls, Poughkeepsie, N.Y., ass'gnor to International Business Machines Corporation, New York, N.Y., a corporation of New York Filed Nov. 25, 1958, Ser. No. 776,259
5 Claims. (Cl. 340—174)

This invention relates to a metallic memory array and more particularly to a means for fabricating such an array wherein isolation of the individual memory areas is provided.

As it is well known in the art, metallic films either evaporated, electrodeposited, or rolled into a form of thin films or sheets, may be used as memory storage elements in computer mechanisms. While the feasibility of using such memory elements has been demonstrated for single memory bits, only a few memory arrays have thus far been provided. One scheme for preparing such an array is described in detail in a co-pending application entitled "Electrode and Probe Sensing Method" filed by Robert Ward, Serial No. 748,919 and assigned to the same assignee as this invention. This scheme describes a method for sensing a change in state of a magnetic material during switching and uses rolled sheets of a ferromagnetic metal such as premalloy as memory material. It is desired to improve this array by providing better isolation for each memory bit.

Still another process for producing a memory array comprises punching holes in a sheet of thin magnetic material in order to allow individual wires to be run through the memory areas. Multipath logical arrays such as those described in the copending application Serial No. 706,179 filed December 17, 1957 by L. A. Russell and assigned to the same assignee as this invention, are generally fabricated by running wires from one logical element to another, utilizing air to isolate each magnetic element.

Accordingly, an object of this invention is to provide new and improved computer devices.

A further object is to provide methods whereby memory storage devices may be fabricated wherein the individual memory bits are magnetically isolated one from the other.

Still another object is to provide a logical array in which each logical element is magnetically insulated from other elements in the array.

Other objects of the invention will be pointed out in the following description and claims and illustrated in the accompanying drawings, which disclose, by way of example, the principle of the invention and the best mode, which has been contemplated of applying that principle.

In the drawings:

FIGURE 2 is a schematic representation of an apertured copper sheet.

FIGURE 3 shows a thin sheet of magnetic material.

FIGURE 4 shows the apertured copper sheet positioned on the magnetic sheet prior to sintering.

FIGURE 5 shows the completed memory array prepared by sintering the assemblage of FIGURE 4.

FIGURE 6 shows an apertured metallic sheet.

FIGURE 7 shows an apertured copper sheet, as shown in FIGURE 1, positioned on the apertured metallic sheet prior to sintering.

FIGURE 8 shows the completed memory array prepared by sintering the assemblage of FIGURE 7.

Figure 9:
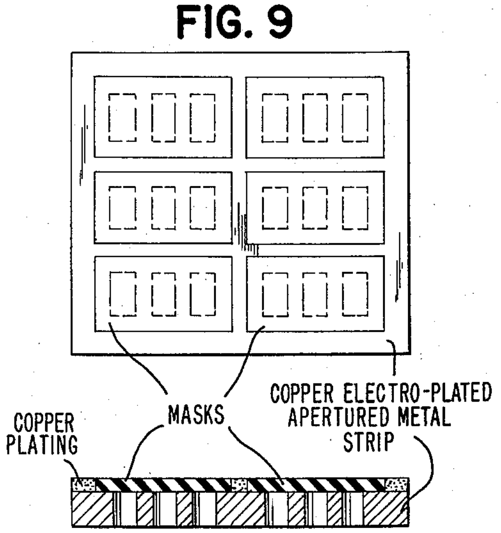
Figure 10:
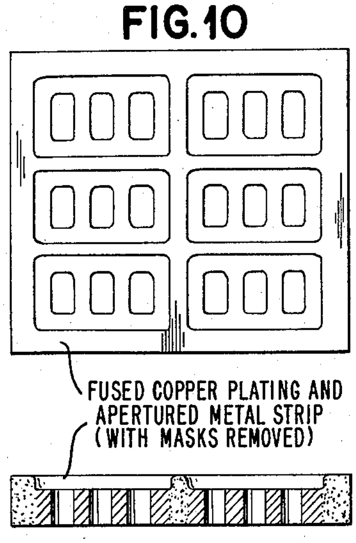

FIGURES 9 and 10 describe a process for preparing an improved array of logical elements.

FIGURE 9 shows a schematic representation of an apertured metallic sheet provided with a layer of copper deposited over a plurality of masks.

FIGURE 10 is a representation of a plurality of logical elements after sintering the structure shown in FIGURE 9.

Figure 1:
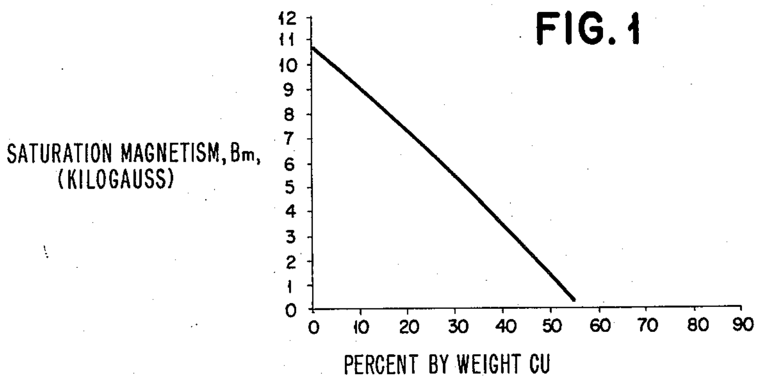
FIGURE 1 shows the relationship of room temperature saturation magnetization, B*m*, versus perventage by weight copper added to the alloy system 80–20% by weight nickel-iron.
Figure 2:
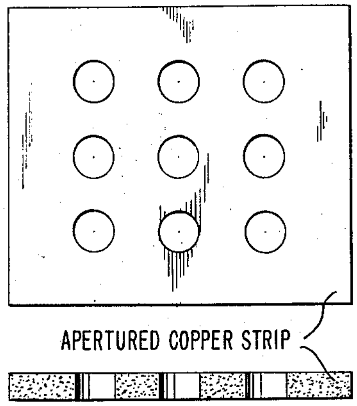
FIGURES 2–5 illustrates the steps of a process of preparing a memory array according to one embodiment of the present invention.

The techniques of the present invention provide means adaptable to large scale automatic processing whereby computer arrays may be fabricated with more desirable magnetic properties than have hitherto been obtainable. Particularly advantageous is the processing of metallic memory and logical arrays from thin sheets of magnetic material. The processes described herein are based upon the observed magnetic characteristic of the nickel-iron-copper system. As is shown in FIGURE 1 the saturation magnetization of alloys in the Fe-Ni-Cu system is sharply dependent upon the percentage of copper addition to 80–120 nickel-iron. A second effect of the copper addition is due to precipitation of a second phase at high copper concentrations. For additions to an 80–20 nickel-iron alloy the solubility limit of copper is about 37 weight percent at room temperature. The precipitation of this second phase also results in a sharp increase in coercive force. Furthermore, additions of copper in the order of 50% or more cause a severe reduction in magnetization and increase in coercive force, making the material, in effect, non-ferromagnetic. This effect is most pronounced in the range of 37–60% Cu. The properties obtainable in this range in the three component system are utilized to prepare the improved computer arrays shown herein.

In essence, therefore, the present invention achieves isolation of magnetic areas by providing substantially non-magnetic regions between memory areas. One particular embodiment illustrates the effect in a thin magnetic film memory array. Another utilizes it in a logical array. Furthermore, methods are indicated wherein these arrays may be fabricated.

Figure 4:
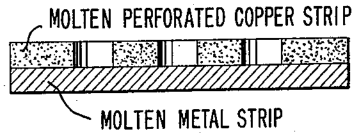
Figure 5:
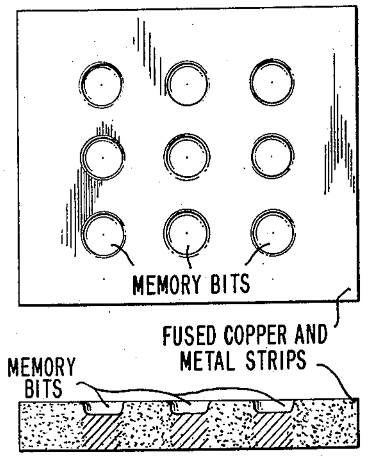
Figure 3:
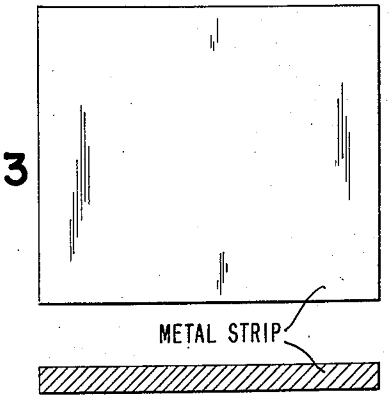

According to one embodiment, as shown most particularly in FIGS. 2–5, an apertured copper sheet is provided and placed over a rolled or otherwise prepared thin magnetic sheet such as a permalloy sheet and assembled as shown in FIGURE 3. An alternate manner of making the structure shown in FIGURE 3 is by electroplating over a suitable mask to produce the composite layers. The composite layers are then heated at elevated temperatures to permit the copper to diffuse into the nickel-iron alloy to form an essentially non-magnetic insulator surrounding each memory bit, as depicted in FIGURE 4.

Figures 6, 8:
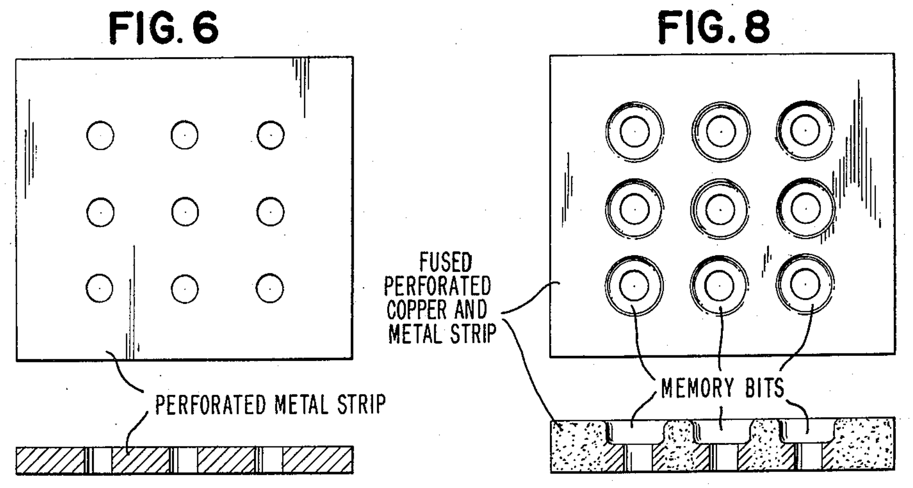
FIGURES 6–8 shows another embodiment by which an improved memory array may be prepared.
Figure 7:
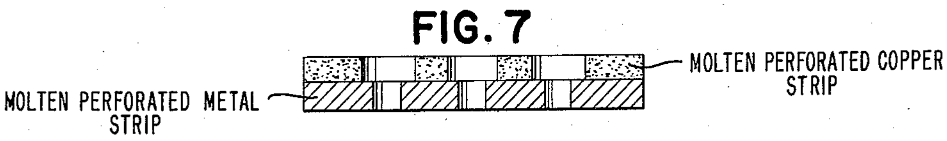

Another embodiment is shown in FIGURES 6–8. An apertured copper sheet is plated or otherwise positioned onto a perforated nickel-iron sheet to form the structure shown in FIGURE 7. The composite layers are then heated to cause diffusion of the copper and the formation, as shown in FIGURE 8, of an apertured thin film memory array in which the memory bit areas are magnetically isolated from each other by an essentially non-magnetic region comprising the three component alloy system.

The process of the present invention may be utilized as shown particularly in FIGURES 9–10 to provide an array of logical elements which are magnetically insulated from each other. An aperatured permalloy plate is provided with an appropriate mask and copper electroplated thereon. The layers are heated to cause diffusion of the copper into the magnetic material so as to provide thereby logical elements separated by a non-magnetic region.

The conditions for carrying out the diffusion step will vary depending upon the thickness of the metallic sheet. In order that diffusion of copper into the iron-nickel alloy result in an essentially non-magnetic region, it is necessary to heat the materials at for example 1000° C. for a time interval approximately defined by the equation $T=1.5\times10^{10}h^2$, where T is the annealing time interval in seconds and $h$ is the thickness of the magnetic sheet in cm. For a 0.25 mil permalloy sheet, an annealing time of 90 minutes is suggested using a copper layer of about the same thickness. Under such conditions isolation of memory areas is achieved without noticeable spreading of magnetic material into non-magnetic regions. For example, if round memory bits of a diameter of about 10 mils are separated from each other by a distance of about 10 mils, a spread of the bit diameter of less than 1 mil occurs when copper is diffused into the areas between each bit.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A memory plane structure of bistable magnetic elements in the form of a thin continuous sheet, said sheet comprising active areas and inactive areas, each said active area made of magnetic material exhibiting a substantially rectangular hysteresis loop, said inactive areas surrounding each said active area and made of material exhibiting non-magnetic properties, said active and inactive areas exhibiting their respective magnetic and non-magnetic properties through the thickness of said sheet to magnetically isolate each said active area from one another.

2. The structure of claim 1, wherein said magnetic material is a nickel-iron alloy.

3. The structure of claim 2, wherein in each unit area of said sheet the amount of nickel-iron per unit is substantially similar whether active or inactive.

4. The structure of claim 3, wherein said non-magnetic area is a nickel-iron-copper alloy.

5. The structure of claim 4, wherein said magnetic material consists essentially of an 80–20% by weight ratio of nickel-iron alloy and the non-magnetic areas comprise copper added in amounts of at least 37% by weight of said alloy.

References Cited in the file of this patent

UNITED STATES PATENTS

| | | |
|---|---|---|
| 1,991,143 | Ehlers | Feb. 12, 1935 |
| 2,712,126 | Rosenberg et al. | June 28, 1955 |
| 2,719,965 | Person | Oct. 4, 1955 |
| 2,784,391 | Rajchman et al. | Mar. 5, 1957 |
| 2,820,216 | Grottrup | Jan. 14, 1958 |
| 2,824,294 | Saltz | Feb. 18, 1958 |
| 2,877,540 | Austen | Mar. 17, 1959 |
| 2,878,463 | Austen | Mar. 17, 1959 |

FOREIGN PATENTS

| | | |
|---|---|---|
| 216,391 | Australia | Nov. 21, 1957 |
| 845,604 | Great Britain | Aug. 24, 1960 |

OTHER REFERENCES

"A Compact Coincident-Current Memory," by Pohm and Burens, in Proc. of East. Joint Computer Conf., Dec. 10–12, 1956, pp. 110–123.